(12) United States Patent
Pavageau

(10) Patent No.: US 9,911,078 B2
(45) Date of Patent: Mar. 6, 2018

(54) CARD AND CORRESPONDING METHOD OF MANUFACTURE

(71) Applicant: INGENICO GROUP, Paris (FR)

(72) Inventor: Stephane Pavageau, La Roche de Glun (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/248,505

(22) Filed: Aug. 26, 2016

(65) Prior Publication Data

US 2017/0061274 A1 Mar. 2, 2017

(30) Foreign Application Priority Data

Aug. 27, 2015 (FR) ..................................... 15 57984

(51) Int. Cl.
*G06K 19/077* (2006.01)
(52) U.S. Cl.
CPC ..... *G06K 19/07743* (2013.01); *G06K 19/077* (2013.01); *G06K 19/0772* (2013.01)
(58) Field of Classification Search
None
See application file for complete search history.

(56) References Cited

U.S. PATENT DOCUMENTS

2010/0243741 A1* 9/2010 Eng ...................... G06K 19/005
235/487
2016/0104065 A1* 4/2016 Tsukada ........... G06K 19/07769
235/492

FOREIGN PATENT DOCUMENTS

DE 19939003 A1 2/2001
WO WO 0113331 A1 * 2/2001 ............. B29C 45/26

OTHER PUBLICATIONS

Preliminary Seach Report from FR 1557984, dated Jul. 13, 2016, Jacobs, Peter.
English abstract of DE19939003 retrieved from Espacenet on Aug. 24, 2016.

* cited by examiner

*Primary Examiner* — Kristy A Haupt
(74) *Attorney, Agent, or Firm* — BCF LLP

(57) ABSTRACT

A card has: a substrate of ID-1 format according to the ISO 7810 standard; and at least one electronic component arranged on the substrate, all or part of said at least one electronic component being disposed in at least one of the two embossing regions defined in the ISO 7811-1 standard as regions in which embossed characters can be formed on the substrate; an encapsulation of the unit comprising the substrate and said at least one electronic component; such that the thickness of the card at the level of said embossing regions does not exceed 1.32 mm.

12 Claims, 4 Drawing Sheets

CARD AND CORRESPONDING METHOD OF MANUFACTURE

CROSS-REFERENCE

This United States Non-Provisional patent application claims priority from French Patent Application Serial No. 1557984, filed on Aug. 27, 2015, the entire content of which is incorporated herein by reference.

FIELD OF TECHNOLOGY

The technology relates to the general field of cards and relates more particularly to the integration of electronic components into cards.

BACKGROUND

Cards are currently used in numerous fields of application. They are intended especially for carrying out bank, telephone, identification and/or authentication operations. These operations can be performed either by inserting the card into a reader (contact mode in which the card chip, equipped with electrical contact zones, comes into contact with a reader), or by reading the magnetic track of the card, or remotely (contactless mode) by electromagnetic coupling between a transceiver terminal and an antenna integrated into the card, which is placed in the action zone of the terminal. In the last-named case, the card chip is not necessarily used (this depends on the configurations).

Owing to progress made in recent years in the designing and manufacture of cards, it is presently possible to include new functions in these cards, for example functions of authentication using a biometric sensor placed in the card. Many other improvements and developments of functions have to be planned in the future.

However, the implementation of certain functions in the cards requires the integration into these cards of electronic components of varying complexity, the space requirement of which varies from case to case. This integration entails certain difficulties inasmuch as most of the cards must comply with standardized dimensional specifications that leave little space and flexibility for integrating electronic components into a card.

Present-day cards are generally compliant with the dimensional specifications provided especially by the ISO 7810 standard. This standard defines the dimensions and tolerance values that a card must comply with, depending on its format, to be able to efficiently cooperate by contact with all the reading terminals provided for this purpose. Non-compliance with this standard can lead to major problems during the interaction of the card with a reading terminal. Typically, a card that is not compliant with the ISO 7810 standard risks not being detected by the reader terminal or risks impairing the operation of this terminal, or again risks not being read.

To date, the constraints dictated by the ISO 7810 standard therefore limit the size and layout of the electronic components which are liable to be integrated into a card, thus preventing the implementing of certain functions which would substantially improve the user's experience in particular.

SUMMARY

It is one of the goals of the present technology to overcome the lacks and drawbacks of the prior art.

To this end, the disclosure proposes a card comprising: a substrate of ID-1 format according to the ISO 7810 standard; and at least one electronic component arranged on the substrate, all or part of said at least one electronic component being disposed in at least one of the two embossing regions defined in the ISO 7811-1 standard as regions in which embossed characters can be formed on the substrate, an encapsulation of the unit comprising the substrate and said at least one electronic component; such that the thickness of the card at the level of said embossing regions does not exceed 1.32 mm.

It is understood that the ID-1 format according to the ISO 7810 standard has a thickness smaller than that of the standard. Besides, the encapsulation of the components and of the substrate makes it possible to homogenize the thickness of the card to reach 0.84 mm max or 1.32 mm max, depending on the regions.

The proposed technique advantageously enables the integration of one or more electronic components of varying space requirements on a card while ensuring the compliance of said card with dimensional specifications defined in the ISO 7810 and ISO 7811-1 standards. In making electronic components at least partially situated in these embossing regions, while maintaining the extra thickness of the card at a maximum of 0.48 mm at the level of said embossing regions, it is advantageously possible to implement functions in the card that are useful especially for the user.

In addition, compliance with the dimensional specifications stipulated in the ISO 7810 and ISO 7811-1 standards enables the card to cooperate normally with all the card readers compatible with the ID-1 format. In particular, the technology prevents any risk of deterioration of the reader and/or malfunctioning of the card with the reader, resulting from non-compliance of the card with the dimensional specifications laid down by the ISO 7810 and ISP 7811-1 standards.

The technology thus enables the integration of relatively bulky electronic components while ensuring optimum functioning of the card and of the associated reader.

According to one particular embodiment, the two embossing regions are respectively demarcated by the zones 1 and 2 as stipulated in the ISO 7811-1 standard and having a height of 0.48 mm.

This height is the maximum height relative to the upper surface of the card.

According to one particular embodiment, the thickness of the card exceeds 0.84 mm at all or part of said at least one electronic component in at least one of said embossing regions.

According to one particular embodiment, each electronic component is made totally in one of said embossing regions so that the card complies with the dimensional specifications laid down in the ISO 7810 and ISO 7811-1 standards. The card is thus capable of cooperating normally with all readers compatible with the ID-1 format.

According to one particular embodiment, said at least one electronic component is made partially in an intermediate region situated between the two embossing regions, said intermediate region extending longitudinally so as to be adjacent throughout its length to the two embossing regions situated on either side, wherein the thickness of the card at the level of the intermediate card does not exceed 1.2 mm. It is thus possible to gain further space in the card to make electronic components.

According to one particular embodiment, the thickness of the card at the level of all or part of said at least one electronic component is strictly greater than 0.84 mm in the intermediate region.

Such an embodiment may however have functional risks.

According to one particular embodiment, the card comprises: at least one pressure sensor placed at the location defined by the ISO 7816-1 standard for the external card contacts, said at least one pressure sensor being capable of generating pressure data when it is mechanically coupled to a complementary reading contact of a reading terminal; and a processing module to determine, on the basis of said pressure data, a pressure applied by each reading contact on the corresponding pressure sensor, wherein said processing module comprises said at least one electronic component.

The technology thus advantageously proposes a card that can act as a troubleshooting card in the sense that it can be used to test the pressure applied by each contact of a reading terminal when this terminal cooperates by contact with said card.

According to one particular embodiment, the card comprises a display module to display a piece of information on the card representing the pressure applied by at least one reading contact.

According to one particular embodiment, the display module comprises at least one light indicator configured to display said information.

The disclosure also proposes a method for manufacturing a card comprising the arrangement of at least one electronic component on a substrate of the card, all or part of said at least one electronic component being disposed in at least one of the two embossing regions defined in the ISO 7811-1 standard as regions in which characters can be formed on the substrate so that the thickness of the card at said embossing regions does not exceed 1.32 mm.

According to one particular embodiment, the thickness of the card exceeds 0.84 mm at all or part of said at least one electronic component in at least one of said embossing regions.

According to one particular embodiment, said at least one electronic component is disposed: either totally in at least one of the two embossing regions so that the card complies with the dimensional specifications defined in the ISO 7810 and ISO 7811-1 standards; or partly in an intermediate region situated between the two embossing regions, said intermediate region extending longitudinally to the surface of the card so as to be adjacent throughout its length to the two embossing regions, wherein the thickness of the card at the level of said at least one electronic component does not exceed 1.32 mm in the intermediate zone.

It must be noted that the different embodiments described here above with reference to the card, just like the advantages associated with said card, can be applied by analogy to the manufacturing method.

It must also be noted that the different embodiments mentioned here above can be combined with each other to implement the present disclosure.

BRIEF DESCRIPTION OF THE DRAWINGS

Other features and advantages of the present technology shall emerge from the following description made with reference to the appended drawings which illustrates examples of embodiments that are in no way exhaustive. Of the figures.

DESCRIPTION

As indicated here above, the technology relates to the integration of electronic components in smart-card type cards. The technology is also aimed more particularly at carrying out an integration of such a kind in such a way that the card can interact normally with conventional reader terminals.

The technology aims more particularly at integrating electronic components into ID-1 format cards according to the ISO 7810 standard.

As mentioned here above, the general principle of the proposed technique lies in the exploitation of embossing zones called "1" and "2" as defined in the ISO 7811-1 standard to integrate at least one electronic component into an ID-1 format card compliant with the ISO 7810 standard. For each of these embossing zones 1 and 2, the ISO 7811-1 standard defines an embossing region in which embossed characters can be formed on the substrate. More specifically, the ISO 7811-1 standard authorizes the formation, in said zones 1 and 2, of embossed characters with a relief height of 0.48 mm maximum, thus defining the two embossing regions in which it is permitted to carry out embossing on the card.

The present technique proposes the efficient use of both embossing regions provided under the ISO 7811-1 standard to make one or more electronic components on a card and to do so while at the same time ensuring that said card totally or almost totally complies with the dimensional specifications specified in the ISO 7810 and ISO 7811-1 standards. Total or almost total compliance with the ISO 7810 and ISO 7811-1 standards advantageously makes it possible for the card to be capable of cooperating normally with the majority of present-day reading terminals.

Other features and advantages of the present disclosure shall emerge from exemplary embodiments described here below with reference to the drawings mentioned here above.

Barring indications to the contrary, the elements that are common or similar in several figures carry the same reference signs and have identical or similar characteristics so that, for the sake of simplicity, these common elements are generally not described again.

Figure 1:
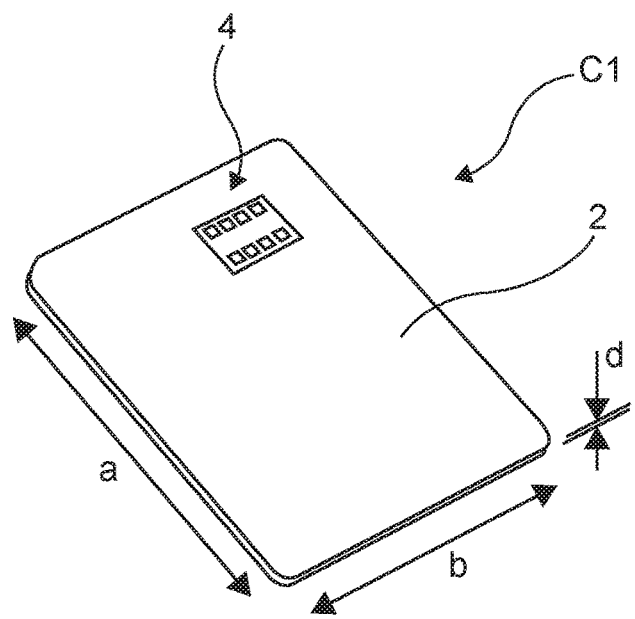
FIG. 1 is a view in perspective or three-quarter view schematically representing the structure of a conventional smart card.

FIG. 1 provides a schematic view of a conventional smart card C1 with an ID-1 format compliant with the dimensional specifications stipulated in the ISO 7810 standard.

The smart card C1 comprises a substrate 2 on which a module 12 is made, this module 12 being provided with external contacts. As represented in FIG. 1, the smart card C1 herein presents especially dimensions a, b and d as defined in the ISO 7810 standard. According to this standard, the thickness of the card C1 must be smaller than or equal to dmax=0.84 mm (millimeters). More specifically, the thickness must range from 0.68 to 0.84 mm.

Figure 2:
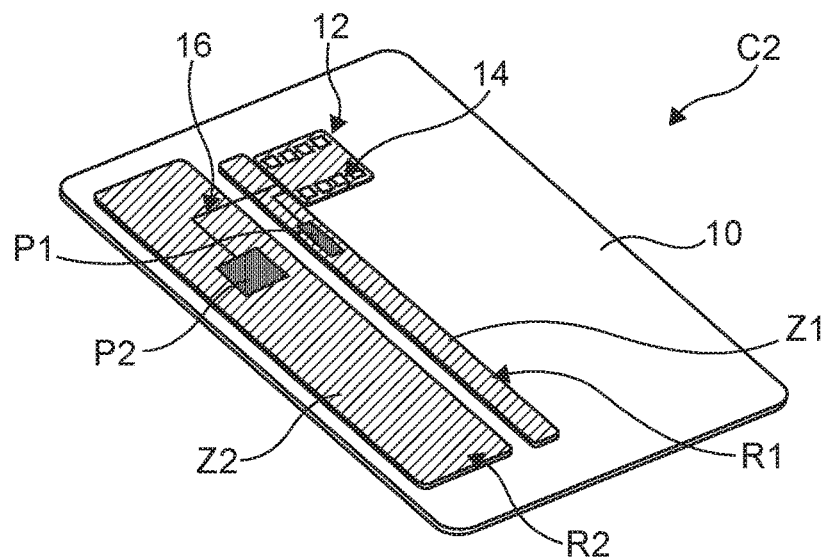
FIG. 2 is a three-quarter view schematically representing the structure of a card according to one particular embodiment.

FIG. 2 provides a schematic view of the structure of a card C2 according to one particular embodiment. It will be noted that certain constituent elements generally forming part of a card have been deliberately omitted because they are not necessary for the understanding of the present technology.

The card C2 has an ID-1 format compliant with the dimensional specifications stipulated in the ISO 7810 standard. More particularly, the card C2 herein comprises a substrate 10 on which there is arranged a module 12 comprising external contacts 14 capable of cooperating with the reading contacts of a corresponding external reader. Typically, an electronic chip (not shown) is mounted on the face of the module 12 opposite the external contacts 14.

FIG. 2 also represents the embossing zones Z1 and Z2 on the surface of the substrate 10. These zones Z1, Z2 respectively correspond to the zones 1 and 2 as defined in the ISO 7811-1 standard, which permits the making of embossings within certain dimensional limits.

Thus, according to the ISO 7811-1 standard: the embossing zone Z1 constitutes a "identification number line" in which it is possible to show an identification number of the card; the embossing zone Z2 constitutes a zone in which it is possible to show information on the identity of the card bearer such as the name, the address and all other relevant information.

The ISO 7811-1 standard requires that the height of the relief (or thickness) of each character embossed in the zones called 1 and 2 (i.e. the zones Z1 and Z2 shown in FIG. 2) should not exceed 0.48 mm. In other words, it is possible according to this standard to make embossings on the card C2 in embossing regions R1 and R2 defined by the respective embossing zones Z1, Z2 and by a height e2=0.48 mm.

In this embodiment, the card C2 comprises a first electronic component P1 disposed in the embossing region R1 and a second electronic component P2 disposed in the embossing region R2. It will be understood that the number, dimensions and layout of the electronic components can be adapted to the context of use without departing from the present technique. In particular, alternative embodiments are possible with a single electronic component made in the substrate, in the embossing region R1 or R2 as the case may be.

FIG. 2 schematically represents an electrical connection 16 electrically connecting the module 12 to each of the electronic components P1 and P2.

Figure 3:
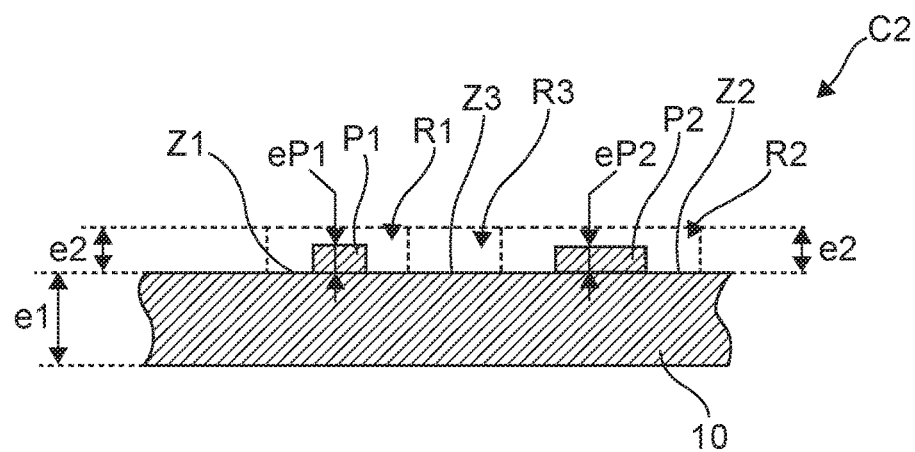
FIG. 3 is a detailed view in section schematically representing a part of the card illustrated in FIG. 2.

As illustrated in the sectional view of FIG. 3, the electronic components P1 and P2 are laid out respectively in the embossing regions R1 and R2. As already indicated, the embossing regions R1 and R2 are defined by the respective embossing zones Z1 and Z2 and by a height e2=0.48 mm.

As indicated here above, the card C2 has an ID-1 format compliant with the dimensional specifications stipulated in the ISO 7810 standard. As a consequence, the thickness e1 of the substrate 10 ranges from 0.68 mm to 0.84 mm (FIG. 3).

Again in this example, the electronic components P1 and P2 respectively have thicknesses eP1 and eP2 which are such that:

$$0 < eP1 \le e2$$

$$0 < eP2 \le e2$$

in which e2 is the height of the embossing regions R1 and R2 as defined in the ISO 7811-1 standard.

According to one particular embodiment, the thickness (e1+e2) of the card C2 exceeds 0.84 mm at the level of at least one of the electronic components disposed in either of the embossing regions R1, R2.

Besides, in the embodiment envisaged here, the electronic components P1 and P2 are each totally included in the embossing regions R1 and R2 respectively. As indicated here below, variants can be envisaged in which each electronic component can, to a certain extent, be made partially outside its embossing region.

In compliance with this embodiment, each electronic component is disposed in such a way that the thickness (e1+e2) of the card C2 at the level of the embossing regions R1, R2 never exceeds 1.32 mm (in compliance with the ISO 7811-1 standard). To this end, in this particular example, the thickness ep1, ep2 of the electrical components P1, P2 does not exceed the height e2=0.48 mm of the embossing regions.

According to one variant, each electronic component P1, P2 can extend in depth in the thickness of the substrate 10 (outside the embossing regions R1, R2 proper) while at the same time preserving a part of said component present in one of the embossing regions R1, R2 it being given that the thickness of the card 10 at the level of the embossing regions R1, r2 does not exceed 1.32 mm.

It must be noted that, in this document, reference is made to the arrangement of "electronic components" in the general sense of the term. An electronic component as understood in the present technique can be any electronic component intended to perform or participate in the performance of an electronic function. Numerous types of electronic components can be envisaged, including optoelectronic or electromechanical components.

In particular, an electronic component according to the technology can be a discrete, active or passive component or a module comprising a plurality of electronic components (integrated circuits etc.). It is possible in particular to envisage the integration of at least one of the following electronic components in a card compliant with the technology: a man/machine type component (keyboard, switch, display unit, biometric sensor, etc.); a sensor of any type (pressure sensor, wear-and-tear sensor, etc.).

The technology advantageously enables the integration of one or more electronic components, having greater or lesser space requirements, on a card while at the same time ensuring the compliance of said card with the dimensional specifications defined in the ISO 7810 and ISO 7811-1 standards. In preparing electronic components at least partially in the embossing regions R1 and R2, while at the same time maintaining the thickness of the card at a maximum of 0.48 mm at the level of said embossing regions R1 and R2, it is possible advantageously to implement functions useful especially for the user, a third party and/or the card-issuing party.

In addition, compliance with the dimensional specifications stipulated in the ISO 7810 and ISO 7811-1 standards enables the card to cooperate normally with all the card readers compatible with the ID-1 format. In particular, the technology prevents any risk of deterioration of the reader and/or malfunctioning of the card with the reader, resulting from non-compliance of the card with the dimensional specifications required by the ISO 7810 and ISO 7811-1 standards.

It is thus possible to integrate relatively bulky electronic components while at the same time ensuring optimal functioning of the card with the reader.

A card C3, according to one variant of the card C2 described here above, is now described with reference to FIGS. 4 and 5.

Figure 4:
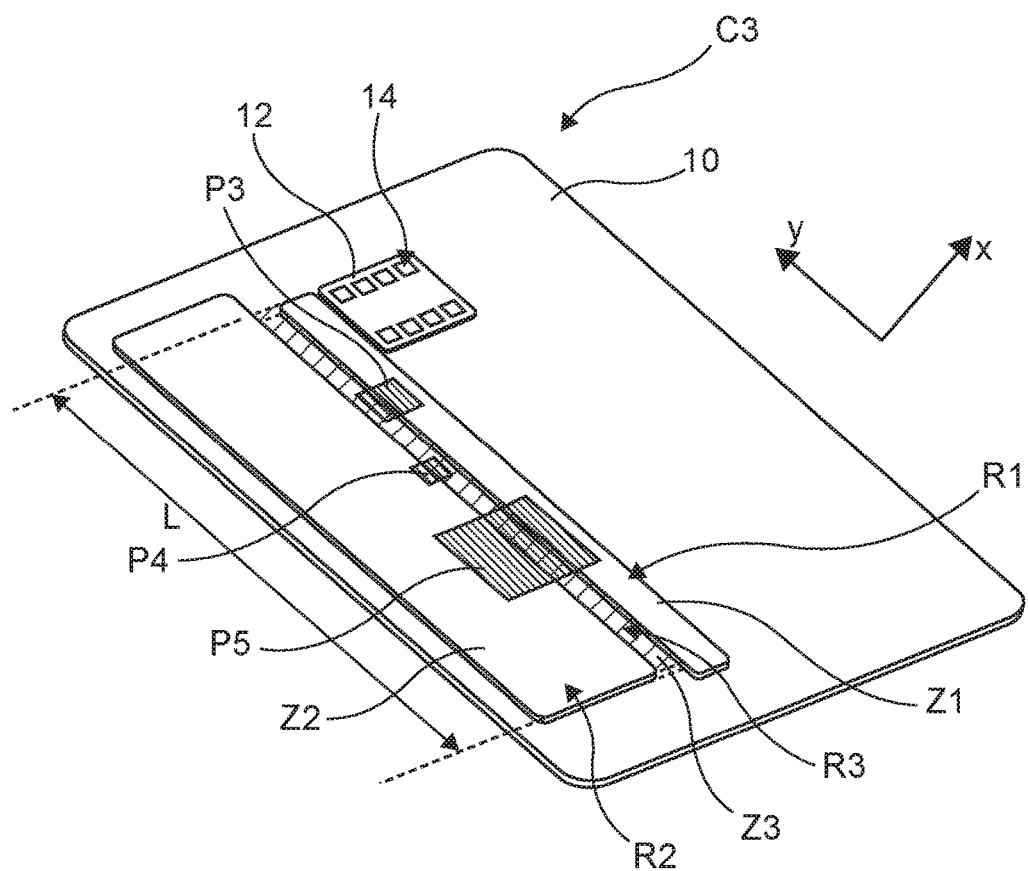
FIG. 4 is a three-quarter view schematically representing the structure of a card according to one particular embodiment.

More particularly, FIG. 4 is a three-quarter view schematically representing the structure of the card C3. The card C3 differs from the card C2 solely in the way in which the electronic components are laid out relative to the embossing zones Z1 and Z2 (and therefore the embossing zones R1 and R2) as defined in the ISO 7811-1 standard.

In this example, the card C3 comprises three electronic components P3, P4 and P5 disposed on the substrate 10. It will be understood here too that the number, dimensions and layout of the electronic components can be adapted to each case without departing from the framework of the present technique.

For the sake of clarity, possible electrical connections between the module 12 and the components P3-P5 (or between the components) have not been shown in FIG. 4.

FIG. 4 also shows an intermediate zone Z3 situated between the embossing zones Z1 and Z2 defined here above. The intermediate zone Z3 is a zone extending longitudinally so as to be adjacent throughout its length with the two embossing zones Z1, Z2 situated on either side.

An intermediate region R3 situated between the embossing zones R1 and R2 is defined by the intermediate zone Z3 and by a height equal to the height e2 of the embossing regions R1 and R2.

Figure 5:
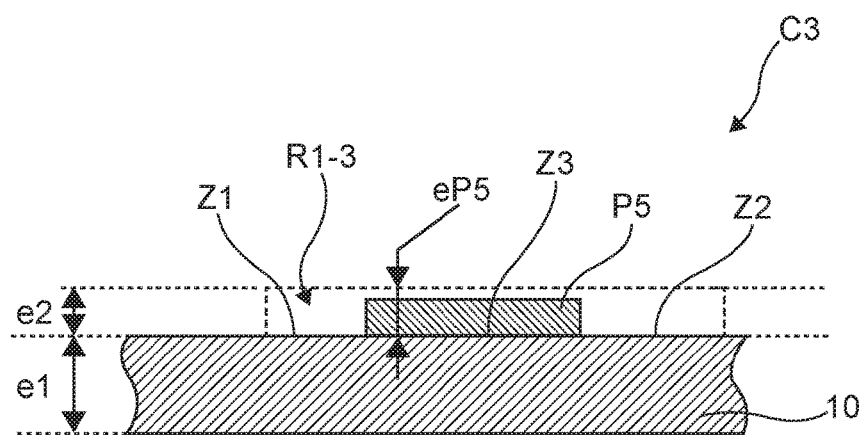
FIG. 5 is a detailed view in section schematically representing a part of the card illustrated in FIG. 4.

FIG. 5 is a detailed view in section more particularly representing, schematically, the arrangement of the electronic component P5 on the substrate 10.

In this particular embodiment, the electrical components P3, P4, P5 are each prepared partly in at least one of the embossing regions R1 and R2 and partly in the intermediate region R3 situated between the embossing regions R1, R2. As represented in FIG. 4, (see also FIG. 3) this intermediate region extends longitudinally (along x) so as to be adjacent throughout its length with the two embossing regions R1, R2 situated on either side.

In a purely illustrative manner, the layout of the electronic components is herein made as follows: the electronic component P3 is disposed partly in the embossing region R1 and partly in the intermediate region R3; the electronic component P4 is disposed partly in the embossing region R2 and partly in the intermediate region R3; and the electronic component P5 extends across the regions R1, R2 and R3.

It is also possible to envisage the making of at least one electronic component totally in the intermediate region R3.

As illustrated in FIG. 4, in the embodiment envisaged here, the intermediate region R3 is demarcated longitudinally by the longitudinal straddling L (along x) of the two embossing regions R1, R2. It will be understood that the variants can be envisaged in which this intermediate region R3 extends longitudinally only on a part of the overlapping L along x.

In one particular embodiment, each electronic component is arranged in such a way that the thickness of the card C3 at the level of the intermediate region R3 does not exceed 1.32 mm.

In the embodiment envisaged here, the thickness of the card C3 at the level of all or part of each component P3, P4, P5 is strictly greater than 0.84 mm in the intermediate region R3.

In one particular embodiment, the thickness eP5 of the electronic component P5 (and more generally of each electronic component in the intermediate region R3) is such that:

$$0 < eP5 \leq e2$$

The technology advantageously makes it possible to prepare electronic components in a region denoted as R1-3 (FIG. 5) formed by the combination of the embossing regions R1, R2 and the intermediate region R3 such as defined here above. The arrangement of all or part of an electronic component in the intermediate region R3 of a card leads to the non-compliance of said card with the dimensional specifications stipulated in the ISO 7811-1 and ISO 7810 standards. Indeed, these standards do not permit the formation of characters by embossing in the zone Z3. However, this variant is advantageous in that the card is nevertheless compatible with the majority of the card readers. It has been observed that the presence of electronic components in the intermediate region R3 does not risk damaging the reader or lead to faults during interactions between the card and the reader. This variant in addition offers greater space on the card and therefore greater freedom to integrate electronic components on said card. Advantageous functions can thus be implemented on a card.

It must be noted that in different embodiments, the card can comprise, if need be, at least one element (an encapsulation material such as resin for example) other than the electronic components, at least partially filling at least one of the embossing regions R1, R2 and the intermediate region R3. This encapsulation is optional. Certain embodiments do not require the presence of such an encapsulation. For the requirements of the present technology, it is specified that encapsulation is an operation used to coat an object with a surface cover that is to modify the properties of the surfaces of the coated object, i.e. protect it against external influences.

A method for manufacturing a card C4 is now described with reference to FIGS. 6 and 7 according to one particular embodiment.

Figure 7:
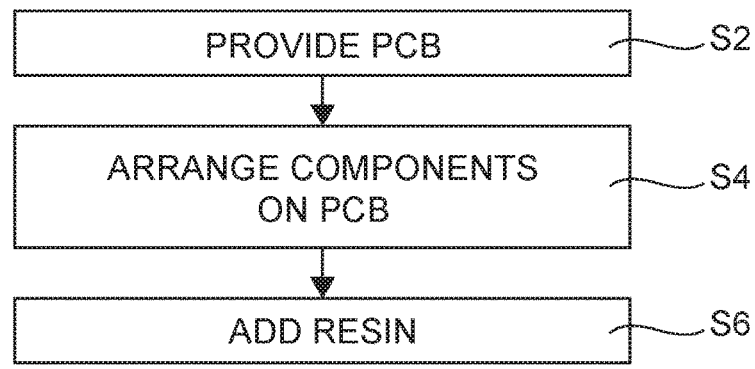
FIG. 7 is a diagram showing the main steps of a method for manufacturing the card illustrated in FIG. 6, according to one particular embodiment.

As represented in the diagram of FIG. 7, a PCB (Printed Card Board) type support 20 for example is made (or provided) at S2. As a variant, the support 20 is a flexible printed circuit (FPC) or any type of other type of support suited to making a card equipped with one or more electronic components.

In this example, the support 20 has a thickness e3=30 mm.

A module 12 comprising external contacts 14 is also arranged on the support 20. The thickness of this module does not exceed 0.4 mm.

Electronic components P are then mounted (S4) (by soldering or any other appropriate method) on the surface of the support 20. Each electronic component P is disposed in one or more of the zones Z1, Z2 and Z3 as defined here above.

In this example, each electronic component P has a maximum thickness (or height) of 0.9 mm.

At S6, an encapsulation material 22 (a resin for example) is deposited (or formed) on the support 20 in such a way that: the external contacts 14 are flush with the surface of the card 4 so that they cooperate with the reading contacts of an external reader; each electronic component P is disposed in the region R1-3 as defined here above.

Each component P is then flush with the surface of the region R1-3 or covered at least partially by the material 22.

The application of the encapsulation material 22 can for example be obtained by over-molding and/or by the addition of a film to the surface of the support 20.

Figure 6:
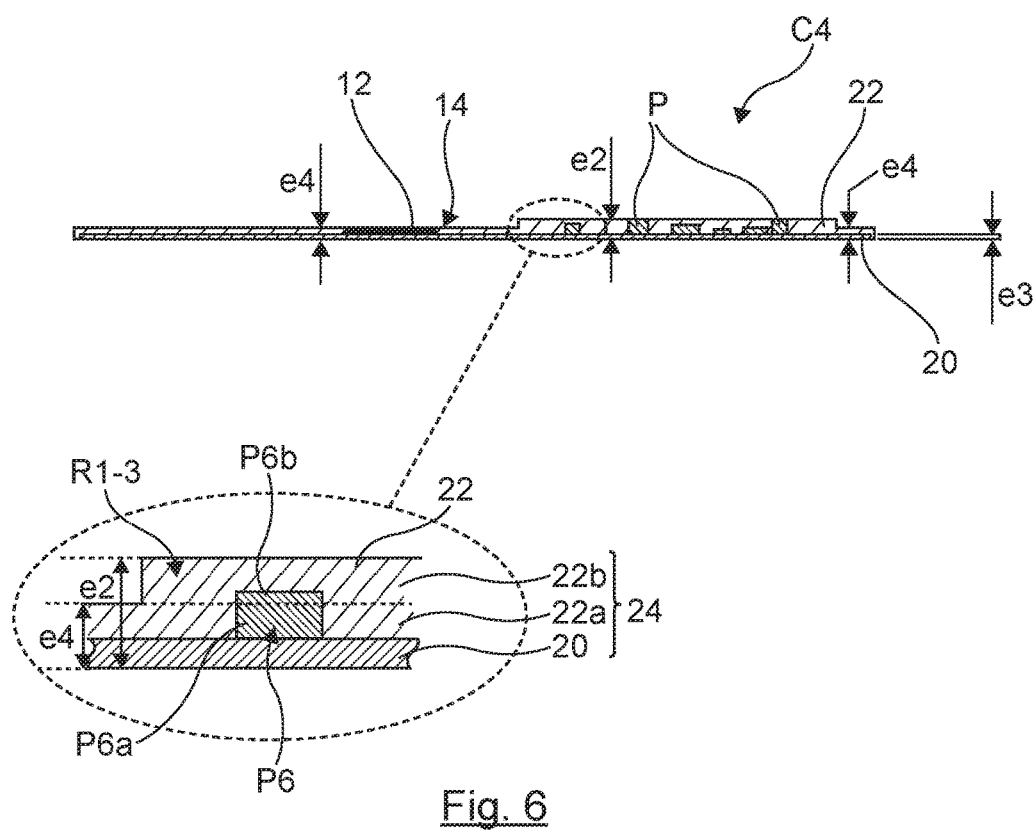
FIG. 6 is a view in section schematically representing the structure of a card according to one particular embodiment.

As shown in FIG. 6, the upper layer 22b of the material 22 (of a thickness e2=0.4 mm) forms the region R1-3 into which the electronic component P6 especially extends partially. As illustrated in FIG. 6, the upper part P6 of the electronic component P6 is disposed in the region R1-3 while the lower part P6a of said component is disposed in the lower layer 22a of the material 22 beneath the upper layer 22b.

The support 20 and the layers 22a and 22b together form the substrate 24 of the card C4.

The lower layer 22a which here covers the totality of the upper face of the support 20 (except for the external contacts 14) has a thickness e4 of 0.42 mm in this example.

Advantageously, at least one of the electronic components P has a thickness greater than the thickness e4 of the lower layer 22a. The region 1-3 (formed by the layer 22b) situated above a part of the layer 22a thus offers the possibility of making relatively bulky electronic components while at the same time enabling the card to work normally with conventional readers.

As a variant, the card C4 can be made in such a way that the intermediate region R3 as defined here above is not occupied (i.e. devoid in this region of any material, component, etc.) so as to totally comply with the dimensional specifications stipulated in the ISO 7811-1 standard.

Figure 8:
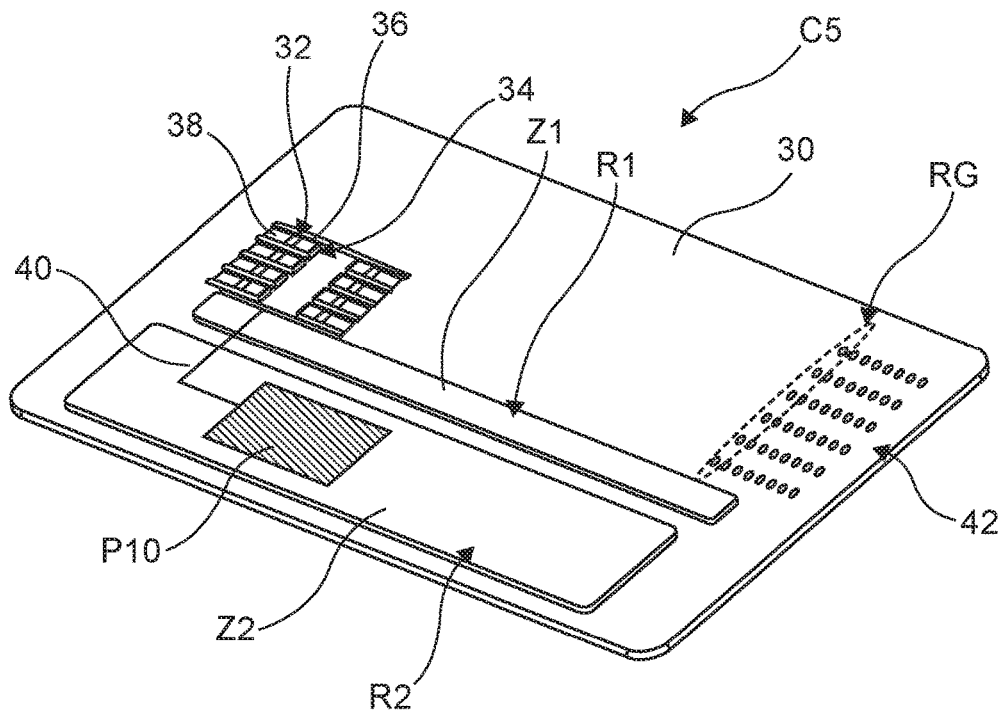
FIG. 8 is three-quarter view schematically representing the structure of a card according to one particular embodiment.

A card C5 compliant with one particular embodiment is now described with reference to FIG. 8.

The card C5 has an ID-1 format compliant with the dimensional specifications stipulated in the ISO 7810 standard. More particularly, the card C5 has a substrate 30, this substrate comprising, on its upper face, at least one pressure sensor 32 (eight such sensors in this example) disposed at the location defined by the ISO 7816-1 standard for at least one of the external card contacts. Each pressure sensor 32 is capable, when mechanically coupled with a complementary reading contact of a reading terminal, of generating pressure data representing pressure (or force) applied by said reading contact to the pressure sensor 32 in question.

In this particular example, each pressure sensor 32 has a flexible strip 34 comprising, on its upper face, a support zone 36 designed to come into contact with the reading contact of the reader when the card C5 and the reader work together. A pressure gauge 38 is furthermore made in each flexible strip 34 in order to generate electrical data representing the pressure applied by a reading contact on the pressure sensor 32 in question. Other ways of making the pressure sensor 32 can however be envisaged without departing from the framework of the present technology.

The card C5 also comprises a processing module P10 capable of determining, from pressure data received from the pressure sensors 32 (via the line 40 in this example), the pressure applied by each reading contact to the corresponding pressure sensor. Those skilled in the art will know the most appropriate way to implement such a processing module P10.

Advantageously, the electronic module P10 is disposed in the embossing region R2 as defined in the ISO 7811-1 standard, similarly to the electronic component P2 represented in FIG. 2. Alternative ways of positioning relative to the embossing regions R1, R2 and the intermediate region R3 as defined here above can of course be envisaged similarly to the embodiments described here above.

The card C5 furthermore comprises a display module 42 to display a piece of information representing the pressure applied by at least one reading contact. In this example, the display module 42 is formed by a plurality of light indicators (of the LED type for example) capable of indicating the information relative to the pressure detected by each pressure sensor 32.

According to one particular example, the light indicators 42 are controlled by the electronic module P10 to display the pressure level detected on each pressure sensor 32.

In this particular example, the light indicators 42 are disposed in a grid constituted by rows RG of light indicators, each row RG comprising a group of light indicators 42 capable of displaying a level of pressure detected by a corresponding pressure sensor 32. As a variant, only one light indicator is associated with each pressure sensor 32, said indicator being capable of emitting an appropriate color, intensity and/or flashing frequency depending on the pressure detected by the corresponding pressure sensor 32.

It will be understood that the type, number and layout of the light indicators and more generally the way in which the display module displays the information on pressure can be adapted to each case without departing from the framework of the present technique.

A card according to this particular embodiment advantageously enables the testing of the force applied by the different contacts of a reader when it cooperates by contact with a card. Typically, a reading contact in normal operation applies a pressure of at least 20 g and at most 60 g. An operator can advantageously use such a card as a troubleshooting card in order to verify that the reading contacts of a reader apply satisfactory force to the card when this card is inserted into the reader. Such a card makes it possible to rapidly and reliably determine whether a reading contact of a reader is defective. Advantageously, the exploitation of at least one of the regions R1, R2 and R3 as defined here above offers sufficient space on the card for the integration therein of the processing module for the pressure sensors. Through the technology, it is possible to integrate a pressure test function into a card while complying with the dimensional requirements defined in the ISO 7810 and ISO 7811-1 standards.

Those skilled in the art will understand that the embodiments and variants described here above constitute only non-exhaustive examples. In particular, those skilled in the art could envisage any combination whatsoever of the variants and embodiments described here above in other to meet a particular need.

What is claimed is:

1. Card comprising:
    a substrate of ID-1 format according to the ISO 7810 standard; and
    at least one electronic component arranged on the substrate, all or part of said at least one electronic component being disposed in at least one of the two embossing regions defined in the ISO 7811-1 standard as regions in which embossed characters can be formed on the substrate;
    an encapsulation of the unit comprising the substrate and said at least one electronic component;
    such that the thickness of the card at the level of said embossing regions does not exceed 1.32 mm.

2. Card according to claim 1, wherein the two embossing regions are respectively demarcated by the zones 1 and 2 as stipulated in the ISO 7811-1 standard and have a height of 0.48 mm.

3. Card according to claim 1, the thickness of the card exceeding 0.84 mm on all or part of said at least one electronic component in at least one of said embossing regions.

4. Card according to claim 1, wherein each electronic component is made totally in one of said embossing regions so that the card complies with the dimensional specifications laid down in the ISO 7810 and ISO 7811-1 standards.

5. Card according to claim 1, wherein said at least one electronic component is made partially in an intermediate region situated between the two embossing regions, said intermediate region extending longitudinally so as to be adjacent throughout its length to the two embossing regions situated on either side,
wherein the thickness of the card at the level of the intermediate card does not exceed 1.2 mm.

6. Card according to claim 5, wherein the thickness of the card at the level of all or part of said at least one electronic component is strictly greater than 0.84 mm in the intermediate region.

7. Card according to claim 1, comprising:
at least one pressure sensor placed at the location defined by the ISO 7816-1 standard for the external card contacts, said at least one pressure sensor being capable of generating pressure data when it is mechanically coupled to a complementary reading contact of a reading terminal; and
a processing module to determine, on the basis of said pressure data, a pressure applied by each reading contact on the corresponding pressure sensor,
wherein said processing module comprises said at least one electronic component.

8. Card according to claim 7, comprising a display module to display a piece of information on the card representing the pressure applied by at least one reading contact.

9. Card according to claim 8, wherein the display module comprises at least one light indicator configured to display said information.

10. Method for manufacturing a card comprising the arrangement of at least one electronic component on a substrate of the card, all or part of said at least one electronic component being disposed in at least one of the two embossing regions defined in the ISO 7811-1 standard as regions in which embossed characters can be formed on the substrate and comprising an encapsulation of the unit comprising the substrate and said at least one electronic component so that the thickness of the card at said embossing regions does not exceed 1.32 mm.

11. Method for manufacturing according to claim 10, wherein the thickness of the card exceeds 0.84 mm at all or part of said at least one electronic component in at least one of said embossing regions.

12. Method for manufacturing according to claim 10, wherein said at least one electronic component is disposed:
either totally in at least one of the two embossing regions so that the card complies with the dimensional specifications defined in the ISO 7810 and ISO 7811-1 standards;
or partly in an intermediate region situated between the two embossing regions, said intermediate region extending longitudinally to the surface of the card so as to be adjacent throughout its length to the two embossing regions,
wherein the thickness of the card at the level of said at least one electronic component does not exceed 1.32 mm in the intermediate zone.

* * * * *